OPTICAL ENCODER

Filed Jan. 26, 1962 4 Sheets-Sheet 1

Inventors
Wilfred K. Brown
Edward M. Jones
By Stone, Nierman,
Burmeister, & Zummer
Attorneys

OPTICAL ENCODER

Filed Jan. 26, 1962 4 Sheets-Sheet 2

Inventors
Wilfred K. Brown
Edward M. Jones
By: Stone, Nierman, Burmeister & Zummer
Attorneys Sept. 7, 1965 W. K. BROWN ETAL 3,205,491

OPTICAL ENCODER

Filed Jan. 26, 1962 4 Sheets-Sheet 3

Inventors
Wilfred K. Brown
Edward M. Jones

Stone, Nierman,
Burmeister & Zummer
Attorneys

OPTICAL ENCODER

Filed Jan. 26, 1962 4 Sheets-Sheet 4

Inventors
Wilfred K. Brown
Edward M. Jones
By: Stone, Nierman, Burmeister & Zummer
Attorneys 3,205,491
OPTICAL ENCODER
Wilfred K. Brown, San Diego, Calif., and Edward M. Jones, Cincinnati, Ohio, assignors to D. H. Baldwin Company, a corporation of Ohio
Filed Jan. 26, 1962, Ser. No. 169,063
10 Claims. (Cl. 340—347)

The present invention relates generally to optical encoders, and particularly to devices for improving the reliability of optical encoders.

Optical encoders are commonly used to transform analogue information to digital form. Generally, optical encoders employ a code disc mounted to a rotatable shaft, and the analogue information is impressed upon the rotatable shaft. The code disc is provided with one or more annular tracks of opaque and transparent sectors coaxially disposed about the center of the code disc. A lamp is disposed adjacent to one side of the code disc, and light responsive cells are disposed on the other side of the code disc confronting respective tracks.

Each of the cells produces an electrical response when illuminated which is different from the electrical response of the cell when maintained in the dark. The ratio of the electrical response of a cell when illuminated to the electrical response of the cell when maintained in the dark is referred to as the light to dark ratio. An optical encoder has some means for determining which of the cells of the encoder confronts a transparent sector of the code disc at a particular time, and this means is responsive to the light to dark ratio of the cells. The cells used in an optical encoder may be either of the photovoltaic type or the photoconductive type. A photovoltaic cell produces electromotive force in response to illumination, while a photoconductive cell exhibits a much higher electrical resistance in the dark than it does when illuminated.

One object of this invention is to obtain a photocell system that is less sensitive to changes in light intensity, individual photocell sensitivities, and disc imperfections.

It is an object of the present invention to increase the light to dark ratio of electrical responses of the photocells of an encoder. As the resolution of an encoder is increased, the circumferential length of the transparent and opaque sectors of the tracks of an encoder decrease making it more difficult to collimate the light from the light source sufficiently to avoid seepage of light around the edges of an opaque sector. Also, the same condition results in a portion of the light being blocked from passage through the transparent sectors. Thus, the optimum dark response of the photocells is never achieved, nor is the optimum light response achieved. This is true even though a collimating slit is employed.

In a commercially available 16 digit encoder, the transparent and opaque sectors of the track of least significant digits have a circumferential length of 0.00075 inch, and light from this track of the code disc passes through a 0.0002 inch slit positioned between 0.004 and 0.005 inch from the code disc. It is to be noted that in this practical construction, the code sectors have a width of approximately three-and-one-half times the slit width, and the slit is positioned from the code disc at a distance 20 times its width. This distance between the slit and the code disc cannot be substantially decreased because of the fact that dirt lodging between the disc and the slit will damage the code disc or the slit, and decrease reliability. This relatively long distance between the slit and the code disc permits sufficient dispersion of the collimated light beam to limit the light to dark ratio substantially. Efforts have been made to improve the light to dark ratio by increasing the width of the opaque sectors of the tracks of the code disc. This technique will increase the light to dark ratio slightly, however, since the magnitude of the light passing through the transparent sectors of the code disc is reduced, only limited improvement can be achieved. If the dark sectors are widened so that the ratio of the length of the dark sectors to the length of the light sectors exceeds the ratio of 5 to 4 or 6 to 4, the light to dark response is deteriorated rather than improved.

Efforts have also been made to eliminate the slit so that the light responsive cells may be positioned closer to the code disc and the light source. This technique of increasing the light to dark ratio of the encoder is more fully described in the patent application of Pong entitled "Encoder," Serial No. 631,818, filed December 31, 1956, now Patent No. 3,076,959.

It is also an object of the present invention to provide an optical encoder employing photoconductive cells which are provided with load impedances varying inversely with the impedance of the photoconductive cells.

Optical encoders which utilize photoconductive cells are well known, and the basic circuit of such encoders is disclosed in the publication "Notes on Analogue-Digital Conversion Techniques" by Alfred K. Susskind, published by the Massachusetts Institute of Technology, 1957, at page 8–27. In this elementary photoconductor circuit, a source of electromotive force in the form of a battery is connected in series with a photoconductive cell and a load resistor. Since the resistance of the photoconductive cell is higher in the dark than when illuminated, the current flowing through the load resistor is greater when the photoconductive cell is illuminated than it is in the dark. As a result, the voltage drop across the load resistor is greater when the photoconductive cell is illuminated than when it is in the dark. As a practical matter, photoconductive cells can be constructed which have a light to dark ratio of approximately ten thousand to one; however, because of constructional difficulties within an encoder itself, the light to dark ratio exhibited by the photoconductive cells of an encoder may be as low as three to one.

These and further objects of the present invention will be more apparent upon a further consideration of this disclosure, particularly when viewed in the light of the drawings, in which:

FIGURES 1(*a*) and 1(*b*) are fragmentary elevational views of code discs which may be used in the practice of the present invention;

Figure 1:
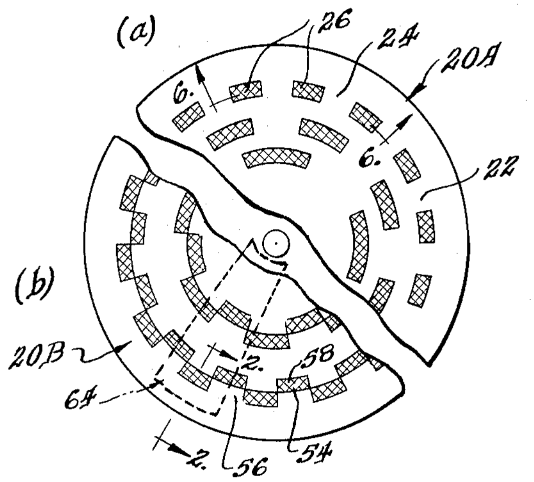

FIGURE 1(*a*) illustrates a conventional cyclic code disc, the transparent sectors being shown by solid areas, and the outlined areas representing opaque sections of the disc. This disc, designated 20A, is identical with the code discs employed in commercially available encoders, and has a plurality of tracks 22 of alternating opaque sectors 24 and transparent sectors 26. As can be seen most readily from FIGURE 6, the code disc 20A is formed by a transparent disc 28, which may be of glass for example, and an opaque layer 30 disposed on one of the surfaces of the disc 28. The layer 30 contains the tracks 22 of the code disc as a result of the spaced transparent sectors 26. The transparent sectors 26 and opaque sectors 24 are of equal circumferential length in each track 22 of the code disc 20A.

Figure 6:
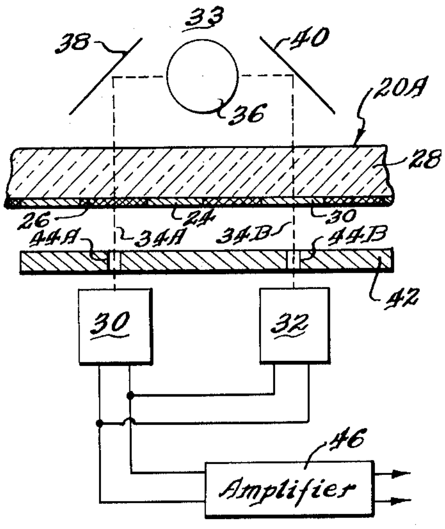
FIGURE 6 is a fragmentary sectional view, partly diagrammatic, taken along the line 6—6 of FIGURE 1(*a*)

As illustrated in FIGURE 6, a pair of light responsive cells 30 and 32 confront each track of the code disc, the cells being positioned an odd multiple of the circumferential length of the sectors of the disc so that one of the cells confronts a transparent sector 26 of the code disc 20A at the same time that the other cell confronts an opaque sector 24. Since it is difficult to position photocells confronting adjacent sectors of a single track, FIGURE 6 illustrates the pair of photocells 30 and 32 confronting sectors separated by two sectors, that is, the cell 32 confronts the second opaque sector 24 from that transparent sector 26 confronting the cell 30, rather than the adjacent opaque sector. This construction requires a light source 33 which provides two collimated light beams, designated 34A and 34B directed toward the two cells 30 and 32. To achieve this end, the light source 33 utilizes a lamp 36 and a pair of mirrors 38 and 40 on opposite sides of the lamp 36 and in combination with a slit plate 42 having a pair of spaced slits 44A and 44B. The slit 44A is aligned with the cell 30, while the slit 44B is aligned with the cell 32. It is to be noted that only one of the cells 30 or 32 is illuminated at a given time, the other cell being shielded from the light source 33 by an opaque sector of the code disc 20*a*.

The encoder configuration of FIGURE 6 may be constructed with light responsive cells 30 and 32 which are photovoltaic or photoconductive cells. FIGURE 6, however, illustrates the cells 30 and 32 as photovoltaic cells, and the cells 30 and 32 are connected in parallel across the input of an ampifier 46. The cells are connected in electrical opposition to each other, that is, illumination of the cell 30 impressing a negative potential across the input of the amplifier 46 while illumination of the cell 32 impresses a positive potential across the amplifier input. Since only one of these cells 30 and 32 is illuminated at a given time, the amplifier receives either a positive or a negative input.

Figure 2:
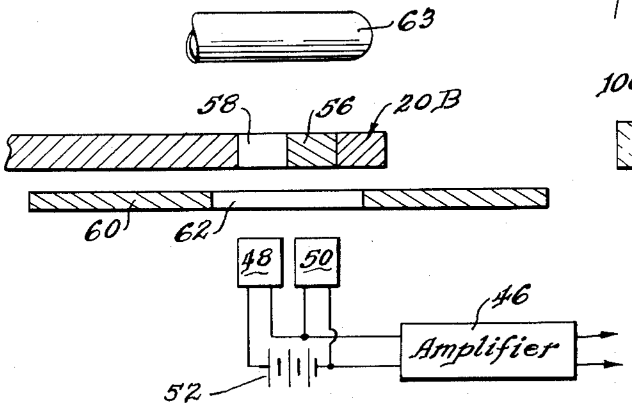
FIGURE 2 is a fragmentary sectional view, partly diagrammatic, taken along the line 2—2 of FIGURE 1.

FIGURE 2 illustrates a pair of photoconductive cells 48 and 50 connected in a photocell circuit which may be utilized in place of the cells 30 and 32 of FIGURE 6. The photoconductive cells 48 and 50 are connected in a series circuit with a direct current power source, illustrated as battery 52, and the photoconductive cell 50 is connected across the input of an amplifier which has been designated 46 since it is identical to the amplifier of FIGURE 6. The photoconductive cells are resistance elements which have a lower value of resistance when illuminated than when in the dark. Since only one of the cells 48 and 50 is illuminated at a given time, the total resistance in the circuit at appropriate sampling periods is the same regardless of which of the cells is illuminated at a given time, provided the cells are accurately matched. The amplifier 46 therefore has a potential impressed upon its input which is the product of the current in the photocell circuit and the value of the resistance of the cell 50 at that particular time.

By utilizing a single light source 33 in combination with a pair of light responsive cells, as set forth in FIGURES 2 and 6, it is not necessary to use an inversion amplifier and a light compensating cell to minimize the effects of variations in light intensity as described in the application of Edward M. Jones, Serial No. 655,653, filed April 29, 1957, entitled "Optical Encoder," now Patent No. 3,023,406. The presence of dirt particles confronting only one of the cells 30 and 32, or 48 and 50, does not affect the polarity of the input to the amplifier 46 and hence the output remains usable for triggering purposes.

FIGURE 1(*b*) and 2 illustrate an encoder with a more conventional light source and a code disc having dual tracks for accomplishing the same results as the structure set forth in FIGURE 6. The code disc of FIGURE 1(*b*), designated 20B, has a plurality of coaxial tracks 54 which each contain radial sectors having a pair of segments 56 and 58. The track 54 is divided into radial sectors, similar and equal in circumferential length to the sectors 24 and 26 of the track 22 shown in FIGURE 1(*a*), but each of these sectors is divided into a radially inward segment and radially outward segment. One of these segments in each sector, designated 56, is opaque, and the other segment 58 in each sector is transparent. Further, adjacent radial sectors have their transparent and opaque segments reversed, that is, the radially inward segment of adjacent sectors alternate between opaque and transparent sectors, as do the radially outward segments.

The light responsive cells 48 and 50 are disposed on the same radius of the code disc 20B, the cell 48 confronting the radially inward segments of the code track 54 and the cell 50 confronting the radially outward segments of the code track. In FIGURE 2, a transparent segment 58 confronts the cell 48 and an opaque segment 56 confronts the cell 50. A slit plate 60 is disposed between the code disc 20B and the cells 48 and 50, and a single radial defining slit 62 confronts the cells 48 and 50. A light source 63 is aligned with the slit 62 and the cells 48 and 50.

Figure 3:
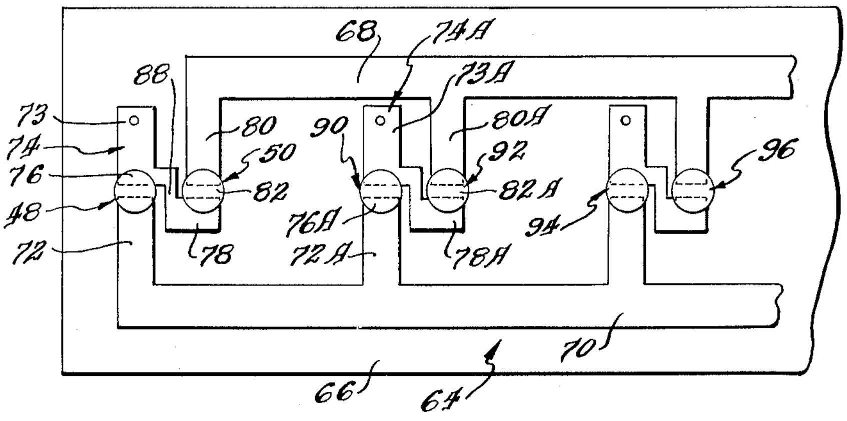
FIGURE 3 is an elevational view of a photocell assembly suitable for use in the present invention.

Since each track 54 of the code disc 20B requires two cells, it is convenient to fabricate these cells in an assembly indicated by the dotted line in FIGURE 1(*b*) and designated 64. This cell assembly 64 is illustrated in detail in FIGURE 3. A base plate 66 of electrically insulating material, such as glass, is provided with two strips 68 and 70 of electrically conducting material. The strips 68 and 70 are disposed adjacent to the longitudinal edges of the plate 66 and on the same surface thereof. A leg portion 72 extends from the strip 70 toward the axis of the photocells in the assembly, and terminates at a short distance from the axis and on the opposite side of this axis from the confronting edge of a first portion 73 of a terminal coating or strip 74. The terminal strip 74 and leg portion 72 are interconnected by a mass of photoconductive semiconductor material, such as cadmium selenide, cadmium sulfide, lead sulfide, lead selenide, zinc selenide, zinc sulfide, zinc teluride, cadmium teluride, germanium, silicon, or lead teluride.

The terminal strip 74 has a second portion 78 which is disposed on the opposite side of the photocell axis from the first portion 73 and confronts a leg portion 80 which extends toward the photocell axis from the electrically conducting strip 68, and a mass of photoconductive material 82 extends between the second portion 78 of the terminal strip 74 and the leg 80. The second portion 78 of the terminal strip 74 is electrically interconnected with the first portion by a thin bar 88 extending across the photocell axis between the two photocells 48 and 50. It can be seen from FIGURE 2, that the bar 88 interconnects one of the electrodes of each of the photocells 48 and 50, and the terminal strip 74 forms a terminal for connection to the amplifier 46, the leg portions 72 and 80 forming the other terminals of the photocells 48 and 50.

The first portion 73 of the terminal strip 74 terminates on the same axis as the end of the leg portion 80, and this axis is adjacent and parallel to the radius of the code disc 20B referred to above. In like manner, the end of the leg 72 and the second portion 78 of the interconnecting strip 74 terminate on a second axis which is parallel to the first axis and on the opposite side of the axis of the photocell assembly, and the axis of the photocell assemby confronts a radius of the code disc 20B.

A second pair of photocells 90 and 92 are mounted on the plate 66 on the axis of the photocell assembly confronting the next radially inward track 54 of the code disc 20B, and a third pair of photocells 94 and 96 are also mounted on the plate 66 on the axis of the photocell assembly confronting the next radially inward track of the code disc. Additional pairs of photocells confront each of the tracks of the code disc. In this manner, each of the dual tracks of the code disc is provided with a pair of photocells disposed on a radius of the code disc and confronting that track. The photocell 90 is formed by a leg 72A of electrically conducting material extending from the electrically conducting strip 70 to the axis terminating the strip 72. A second terminal strip 74A has a first portion 73A mounted to confront the end of the leg 72A on the opposite side of the photocell assembly axis, and a mass 76A of semiconductive photoconductor material extends between the leg 72A and the first portion of the terminal strip 74A. In like manner, the photocell 92 is formed by a leg 80A extending from the electrically conducting strip 68 to confront the axis of the photocell assembly and a second portion 78A of the terminal strip 74A which confronts the opposite side of the photocell assembly axis. A mass 82A of photoconductive material extends between the leg 80A and the second portion 78A of the terminal strip 74A. The other photocells of the photocell assembly 64 are fabricated in the same manner.

Figure 5:
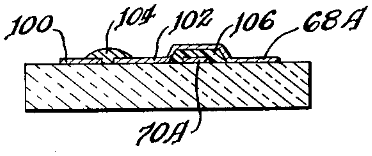
FIGURE 5 is a sectional view of the modified photocell assembly of FIGURE 4 taken along the line 5—5.

If each pair of photocells are to be close together, the interconnecting bar 88 between the first and second portions of the terminal strip 74, and 74A, must be accurately positioned. The photocell assembly illustrated in FIGURES 4 and 5 and designated 64A overcome this difficulty. In this assembly 64B, an insulating base plate 66A is employed and may be glass. An electrically conducting strip 70A is disposed on the surface of the base 66A and corresponds to the strip 70 of the photocell assembly 64. This strip 70A is provided with a leg portion 98 which extends toward the axis of the photocell assembly 64A. The leg 98 terminates at a distance from a rectangular terminal coating 100 which is over twice as wide as the leg 98. A second leg 102 is disposed parallel to the first leg 98 and terminates at a distance from the terminal coating 100 also. A strip 104 of photoconductive material extends across the ends of the legs 98 and 102 and the edge of the terminal coating 100 to form a pair of photocells 48A and 50A.

A strip of electrically insulating material 106 extends over the electrically insulating strip 70A, and may be a nonconducting plastic, such as a hard vinyl plastic. The leg 102 extends over the electrically insulating strip 106 and connects electrically and mechanically to a second electrically conducting strip 68A which is parallel to the first electrically conducting strip 70A. In is to be understood that the strips 68A and 70A may be electrically conducting films, and in like manner the electrically insulating strip 106 may be an electrically insulating film. The leg 102 may also be a film deposited directly on the base 66A and the film strip 106 of insulating material.

Figure 4:
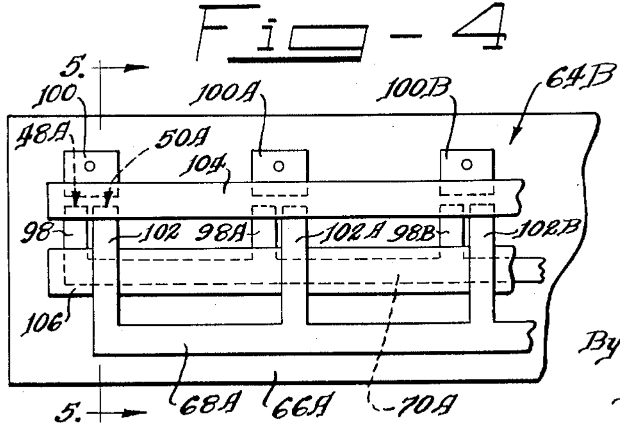
FIGURE 4 is an elevational view of a modified construction of a photocell assembly suitable for use in the present invention.

As is clear from FIGURE 4, as many pairs of photocells as desired may be fabricated by providing additional legs 98A, 98B, etc. which are electrically and mechanically connected to the electrically conducting strip 70A, and electrically conducting strips 102A, 102B, etc. which are mechanically and electrically connected to the strip 68A. A terminal coating 100A confronts the ends of the legs 94A and 102A, and the photoconductive strip 104 forms a light sensitive resistance contact between these legs and the terminal coating 100A. In like manner, a terminal coating 100B confronts the ends of the legs 98B and 102B, and the strip of photoconductive material 104 bridges the gaps formed by the terminal coating 100B and the two legs 98B and 102B.

Figure 7:
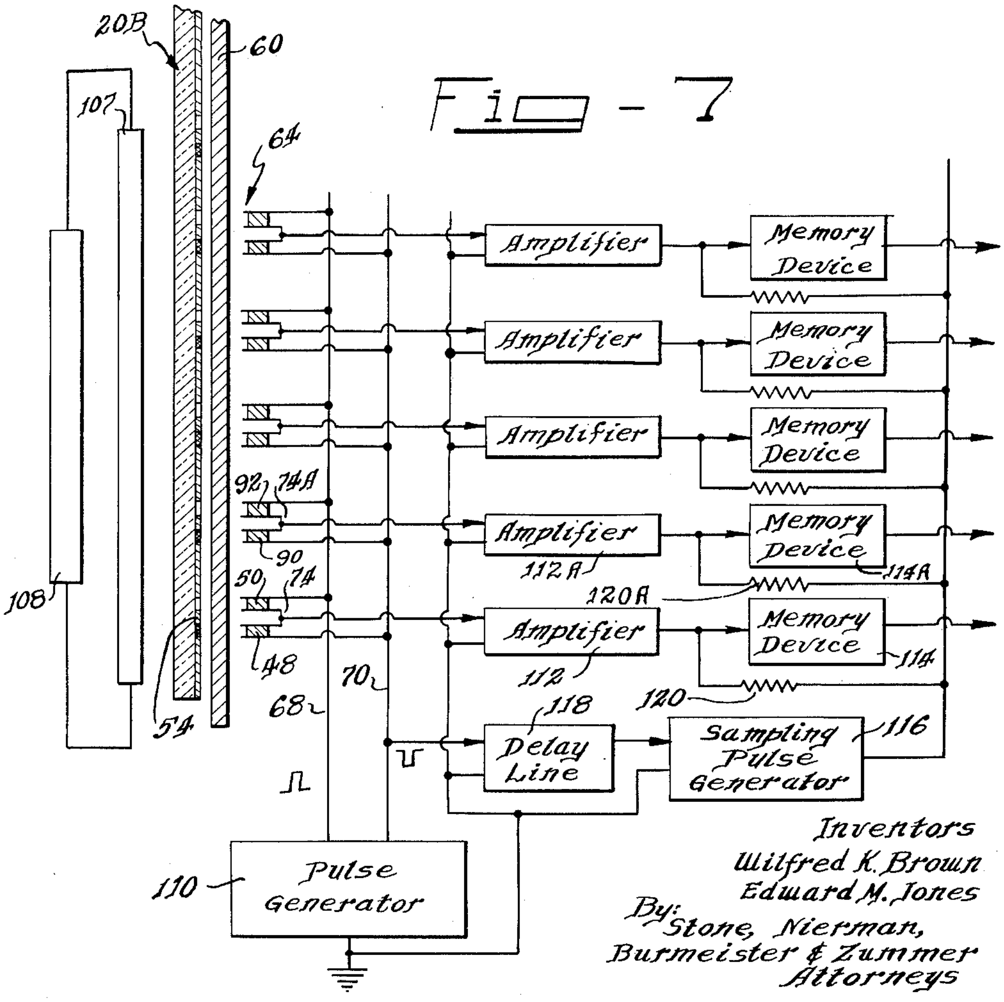
FIGURE 7 is a schematic electrical circuit diagram of an encoder constructed according to the present invention and employing parallel readout, and a constant amplitude light source.

FIGURE 7 illustrates schematically an optical encoder with parallel readout constructed according to the present invention and utilizing a constant amplitude light source. Encoders utilizing light sources of constant intensity are disclosed in the patent application of Edward M. Jones entitled "Optical Encoder," Serial No. 655,653 referred to above. As illustrated in FIGURE 7, the light source comprises a lamp 107 electrically connected to a direct current source 108. For purposes of clarity the code disc 20B is illustrated as confronting the lamp 107, although it is to be understood that the embodiment represented by FIGURE 7 may also utilize the code disc 20A of FIGURE 1(*a*). In like manner, the photocell assembly 64 is diagramatically illustrated as confronting the code disc 20B, although it is to be understood that the photocell assembly 64A can be substituted therefor without modification. Further, the photocell construction diagramatically illustrated in FIGURE 6 can be substituted for the photocell construction here illustrated. A slit plate 60 is illustrated as disposed between the photocell assembly 64 of the code disc 20B, although it is to be understood that a slit plate of the construction illustrated in FIGURE 6 and designated 42 is utilized with a code disc 20A.

A pulse generator 110 provided with two output terminals is connected to the photocell assembly 64. One of the output terminals of the pulse generator 110 is connected to the electrically conducting strip 68, while the other output terminal is connected to the electrically conducting strip 70 of the photocell assembly 64. The first output terminal produces periodic positive square wave pulses, the wave form being indicated adjacent to this terminal, and the second output terminals of the pulse generator 110 produces negative periodic pulses which occur simultaneously with the output pulses on the first output terminal of the pulse generator 110, this wave form also being indicated in FIGURE 7. The terminal strip 74 which interconnects photocells 48 and 50 is connected to the input terminal of an amplifier 112. In like manner, the terminal strip 74A of the photocells 90 and 92 is connected to the input terminal of an amplifier 112A. The terminal strips of other pairs of photocells are each in like manner connected to the input of an amplifier. The output of amplifier 112 is connected to a threshold or memory device 114, and the output of the amplifier 112A is connected to a similar memory or threshold device designated 114A. In this manner, each track of the code disc excites a separate electrical channel including a pair of photocells, an amplifier and a threshold or memory device.

A sampling pulse generator 116 is connected to the second output of the pulse generator 110 through a delay line 118, and the sampling pulse generator 116 generates a single pulse delayed by a short time interval for each of the pulses of the pulse generator 110. The output of the sampling pulse generator 116 is coupled to the input of each of the memory devices 114, 114A, etc. through a resistor 120, 120A, etc.

Operation of the encoder of FIGURE 7 is clear from consideration of only one of the channels, since the channels are identical. Considering the channel comprising photocells 48 and 50, amplifier 112, and memory device 114, it is to be noted that the photocells are of the photoconductive type, and photocell 48 is maintained in the dark while photocell 50 is illuminated. As a result, the resistance of photocell 48 is substantially greater than that of photocell 50, perhaps as high as ten times that of photocell 50. It is also to be noted that the positive pulse applied to photocell 50 and the negative pulse applied to photocell 48 are properly polarized to add to the current in the photocell circuit, that is the current flowing through photocells 48 and 50 and the pulse generator 110. Since the amplifier is connected between the junction of the photocells 48 and 50 and the ground terminal, the ground terminal being essentially a center tap between the two output terminals of the pulse generator 110, the potential applied to the amplifier 112 varies in accordance with the relative illumination of the photocells 48 and 50. When photocell 48 is illuminated, the input applied to the amplifier 112 is of negative potential, while that input is positive when the photocell 50 is illuminated, as is the case of the illustration in FIGURE 7.

The amplifier 112 is an alternating current amplifier, and it produces positive or negative pulses at its output terminal depending upon the polarity of the pulses impressed upon the input of the amplifier. The memory device 114 may be responsive to either positive or negative pulses, and the sampling pulse generator 116 produces pulses of approximately the magnitude of the threshold of the memory device 114 and of the proper polarity therefor. Assuming that the memory device has a positive threshold and that the sampling pulse generator generates positive pulses, the memory device will be triggered only when the amplifier 112 produces a positive output pulse. Assuming the amplifier does not change the phase of the photocell signals, the amplifier 112 will only produce a positive output pulse when photocell 50 is illuminated. The output of the amplifier 112 is less than the threshold of the memory device 114, and hence triggering of the memory device occurs only during the period in which the sampling pulse generator 116 is producing a pulse. This period is delayed from the output of the pulse generator 110 by the delay line 118, and is of shorter duration than the pulses from the pulse generator 110. In this manner, the memory device 114 is triggered at a time when the capacitive transients produced by pulsing of photocells are no longer significant in the output of the amplifier 112. The information stored in the memory device 114 may be utilized in the manner described in the Jones application, Serial No. 655,653, referred to above. Further, it is apparent that each of the memory devices 114, 114A, etc, will be individually triggered by the signals in that channel in synchronism with the sampling pulse generator 116.

Figure 8:
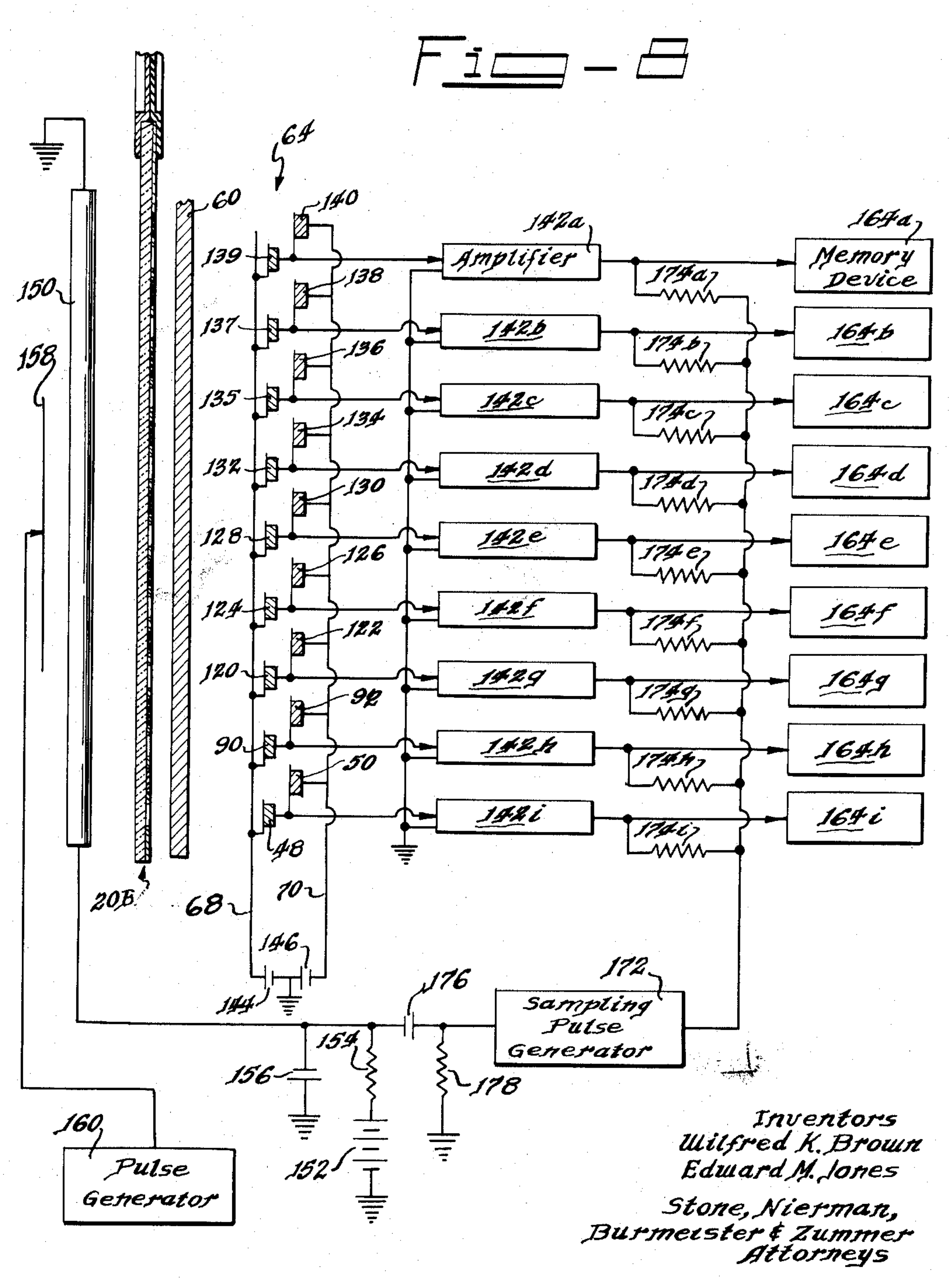
FIGURE 8 is a schematic electrical circuit diagram of an encoder which constitutes a further embodiment of the present invention and which employs a flashing light source and achieves parallel readout.

FIGURE 8 illustrates an encoder with parallel readout constructed according to the teachings of the present invention and provided with a pulsing light source. In this embodiment of the invention, the code disc 20B and photocell assembly 64 are illustrated, although it is to be understood that the code disc 20A and an assembly of cells such as shown in FIGURE 6 could equally well be used. The photocell assembly 64 in FIGURE 8 illustrates nine pairs of photocells for use with a nine digit code disc, although it is to be understood that more or less pairs of photocells can be employed for code discs having different numbers of digits. The photocell pairs are designated 48, 50; 90, 92; 120, 122; 124, 126; 128, 130; 132, 134; 135, 136; 137, 138; and 139, 140. The junction between each of the photocells of each pair is connected to the input of an amplifier, the amplifiers being designated 142*a*, 142*b*, 142*c*, 142*d*, 142*e*, 142*f*, 142*g*, 142*h* and 142*i*. The electrically conducting strip 68 of the photocell assembly 64 is connected to the positive terminal of a battery 144, or other direct current power source, and the negative terminal of a battery 44 is connected to a common ground connection. A second battery 146 has its positive terminal connected to the common ground connection, and its negative terminal connected to the electrically conducting strip 70 of the photocell assembly 64.

A light source in the form of a flash lamp 150 is disposed on the opposite side of the code disc 20B from the photocell assembly 64. The flash lamp 150 is connected in series circuit with a potential source, such as a battery 152, and a resistor 154, and the power source 152 and resistor 154 are by-passed by a capacitor 156. The flashlamp 150 has a firing electrode 158 which is connected to a pulse generator 160.

The outputs of each of the amplifiers 142*a* through 142*i* are connected to the input of a memory device 164*a* through 164*i*, respectively. Sampling of the information stored by the memory device may be accomplished according to presently known techniques, or by the techniques described in the aforementioned patent application.

A sampling pulse generator 172 is connected to the input of each of the memory devices 164*a* through 164*i* through a series resistor 174*a* through 174*i*, respectively. The sampling pulse generator 172 is also coupled to the flash lamp 150 through a differentiating circuit having a series connected capacitor 176 and a parallel connected resistor 178, and is thus locked with the flashing of the light source. The sampling pulse generator 172 may be a synchronized blocking oscillator or a multivibrator.

Assuming each pair of photocells of the photocell assembly 64 is matched, the steady state value of the current through the photocells of that pair will be essentially the same regardless of which of the photocells is illuminated, since the only one of the photocells of the pair will be illuminated at a particular time. As a result, the input of the amplifier associated with that pair of photocells will be either positive or negative depending upon the relative resistances of the two photocells under the conditions of illumination produced by the position of the code disc 20B. The amplifiers 142*a* through 142*i* produce an output which is either positive or negative depending upon the polarity of the input. The output of the amplifiers is insufficient to trigger the memory device associated therewith, and the output of the sampling pulse generator 172 is approximately equal to the threshold of the memory device. Assuming the memory device is to trigger on positive thresholds, the memory device associated with a particular pair of photocells will only trigger responsive to a positive output from the pair of photocells and during the period of the sampling pulse generator 172, this pulse also being positive. Because of the fact that the sampling pulse generator 172 is actuated by the flashing of the lamp 150, the pulse from the sampling pulse generator is delayed from the light pulse producing the output of the pairs of photocells. Hence, the memory devices 164*a* through 164*i* are only triggered during a period of output from the photocell pair coupled to that memory device. A more complete description of the operation of an encoder using a sampling pulse generator is contained in the patent application of Edward M. Jones, Serial No. 727,649, filed April 10, 1958, and entitled "Optical Encoder," now Patent No. 3,020,534.

Figure 9:
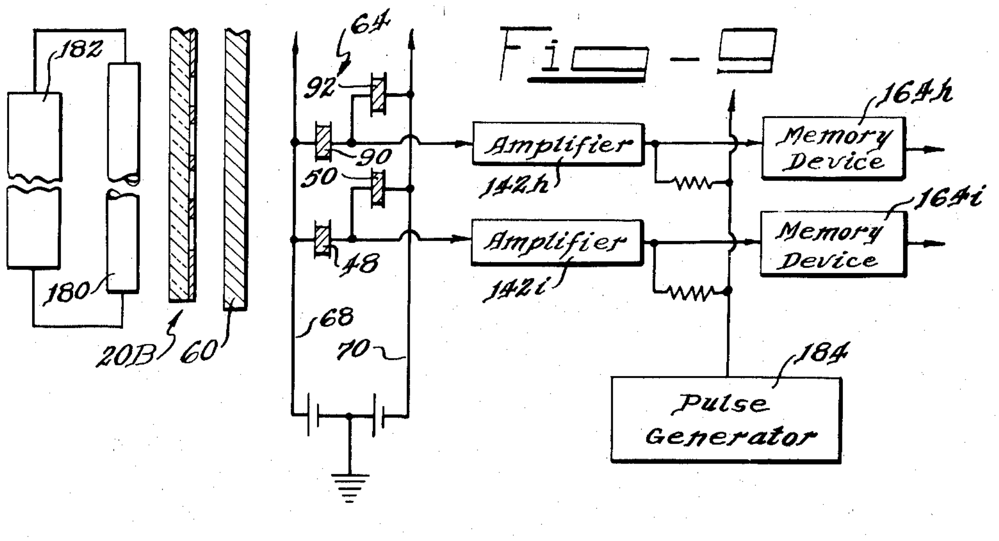
FIGURE 9 is a schematic electrical circuit diagram of an optical encoder which constitutes a further embodiment of this invention and employs a constant amplitude light source to produce parallel readout.

In the embodiment of FIGURE 8, the amplifiers 142*a* through 142*i* produce a positive or a negative output only during the period of the flashing of the lamp, the input to the amplifiers is approximately at the zero potential level, and hence the output is also at approximately this level. FIGURE 9 fragmentarily illustrates an encoder utilizing the code disc 20A and photocell assembly 64, amplifiers, and memory devices of the same construction as that illustrated in FIGURE 8. However, in FIGURE 9, a light source 180 is illustrated with a continuous constant amplitude illumination as a result of power supplied from a continuous power source 182 connected thereto, and the amplifiers 142*h* and 142*i* must be of direct current type. With this construction, the output of each pair of photocells, such as the photocells 48 and 50, is always positive or negative, except for transitions, since the position of the code disc illuminates one or the other of the cells of each pair. The amplifiers 142*i* and 142*h* are direct current amplifiers, and hence the output of each amplifier is either positive or negative. The output of the amplifiers is insufficient to trigger the memory device, and a pulse generator 184 produces periodic pulses of relatively short duration which are also of insufficient magnitude to trigger the memory device. However, the sum of the pulse generator 184 and one of the outputs of each of the amplifiers **142*i*, 142*h*, etc. is sufficient to trigger the associated memory device, hence producing a count for one output condition for each pair of cells during the period of the pulse from the pulse generator 184**.

Figure 10:
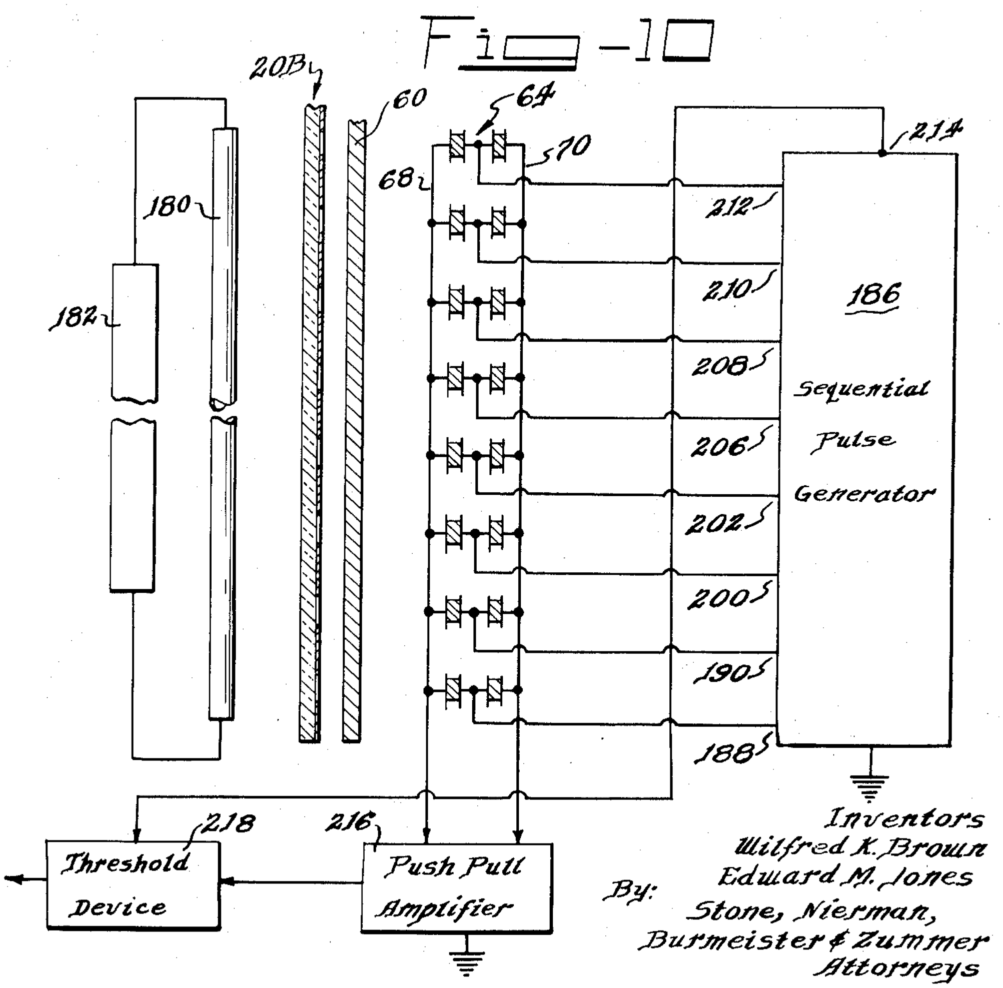
FIGURE 10 is a schematic electrical circuit diagram of still another embodiment of the present invention employing a constant intensity light source and achieving sequential readout.

FIGURE 10 illustrates an optical encoder with a constant intensity light source and a sequential output. Since the light source, code disc and photocell assembly are identical to those illustrated in FIGURE 9, the same reference numerals have been applied to these elements, although it is to be understood that the code disc 20A and the photocell arrangement of FIGURE 6 can also be applied to this embodiment of the invention. In this embodiment of the invention, a sequential pulse generator 186 is employed, and the sequential pulse generator has output terminals 188, 190, 200, 202, 206, 208, 210 212, and 214, as illustrated. The sequential pulse generator 186 produces periodic pulses on the output terminal 214, and simultaneously with each of the pulses on the output terminal 214, one of the other output terminals receives a pulse. In other words, the output terminals 188 through 212 receive pulses at equally spaced intervals in sequence, while the output terminal 214 receives a pulse simultaneously with a pulse on any of the other output terminals.

Each of the output terminals 188 through 212 is connected to the common terminals of one of the pairs of cells of the photocell assembly 64, that is, the output terminal 188 is connected to the junction between the cells 48 and 50, and the output terminal 190 is connected to the junction between the cells 90 and 92, etc. The electrically conducting strips 68 and 70 are connected to the input terminals of a push-pull amplifier 216, the center terminal of the input being grounded and connected to the common or ground terminal of the sequential pulse generator 186. The output of the push-pull amplifier is connected to the input of a threshold device 218. The threshold device also receives a pulse from the output terminal 214 of the sequential pulse generator 186, and is a sampling device which produces an output pulse responsive to the simultaneous output pulse of the push-pull amplifier 216 and the sequential pulse generator 186.

Each pair of photocells of the photocell assembly 64 is pulsed in sequence. When the pulse is received by any pair of photocells, such as the pair 48 and 50, that photocell of the pair which has a low resistance transmits the pulse with greater amplitude to the input of the push-pull amplifier 216 than the other cell of that pair. As a result, the output of the amplifier produces a pulse of a given polarity. For example, if positive pulses appear on the terminal 188 and the photocell 48 is illuminated, a positive pulse will be impressed upon the input of the amplifier 216 between the ground terminal and the electrically conducting strip 68, and this pulse may be assumed to produce a positive output pulse from the push-pull amplifier 216. If the photocell 50 were illuminated rather than the photocell 48, then the positive pulse would be impressed upon the amplifier 216 between the electrically conducting strip 70 and the ground terminal and a negative output pulse would be achieved. Assuming the output pulse from the amplifier 216 to be positive and the memory device 218 to have a positive threshold, the memory device will trigger responsive to the output of the push-pull amplifier 216, since simultaneous with the positive output pulse of the amplifier, the threshold device receives a pulse from the output terminal 214 of the sequential pulse generator 186. Should a positive pulse appear on the output of the push-pull amplifier 216 at any other time, the memory device 218 would not trigger. As a result of this construction, the position of the code disc 20B is interrogated sequentially digit by digit, and the output of the encoder appears as a sequence of electrical pulses or the absence thereof. A further explanation of this mode of operation may be had by reference to the patent application of Edward M. Jones, Serial No. 655,653, referred to above.

One important feature of this dual photocell system is that it reduces the importance of constant photocell sensitivity, constant light intensity, and freedom from disc imperfections.

A typical encoder without the dual photocell feature is usually operated such that the circuitry associated with each photocell is triggered at a point one third of the way from the dark response of the photocell to the light response. Such an encoder will fail to give any meaningful output if the light intensity or photocell sensitivity drops to one third of the normal value. Also, a pin hole in the opaque part of a track transmitting one third of full light will give an erroneous result. Some photocells also exhibit "overrise" or fatigue effect where the response drops considerably after long exposure to light and also change sensitivity with temperature considerably. Compensating systems where the response of a reference photocell receiving a fixed amount of light is subtracted from the responses of the cells opposite the code tracks have been unsatisfactory due to instabilities of the reference cell and lack of tracking of the various photocell sensitivities when temperature is changed.

In the dual photocell systems described above, the light intensity can change a considerable amount without affecting the accuracy of the encoder, and the individual photocell sensitivities can diverge considerably too. As long as the sensitivities within each photocell pair do not diverge more than the light to dark ratio, then the encoder will continue to operate. Also, if the sensitivities within a pair do remain matched, almost any pin holes or dust specks can be tolerated on the disc as long as they do not completely span the radial width of a track.

It is apparent that periodic sampling of the position of the code disc, that is, periodic determination of the position of the code disc relative to an arbitrary zero position, is accomplished during short periods of time. Sampling of the position of the code disc is achieved during a period of time which is short compared with the minimum time required for a sector of the code disc to rotate past the radial defining slit, or in other words, short compared with the maximum rotation rate of the code disc.

From the foregoing disclosure, those skilled in the art will readily device many modifications and improvements for the present invention. It is therefore intended that the scope of the present invention be not limited to the foregoing disclosure, but rather only by the appended claims.

The invention claimed is:

1. An optical encoder comprising a light source, a code disc rotatably mounted confronting the light source having a plurality of circular coaxial tracks with alternate opaque and transparent sectors, each track having two coaxial portions, one of said portions being a radially inward portion comprising a plurality of opaque and transparent sectors disposed between radii of the disc separated by equal angles and the other of said portions being a radially outward portion comprising a plurality of alternate transparent and opaque sectors disposed between the same radii of the disc, each transparent sector of each portion of track being disposed in the same radial sector of the code disc as an opaque sector of the other portion of the track, a pair of light responsive cells mounted on the side of the code disc opposite the source confronting each track of the code disc, each of said cells confronting the disc with one of the cells confronting a transparent sector and the other an opaque sector, an opaque member defining a transparent slit parallel to a radius of the code disc disposed between each of the cells and the code disc, the width of the slit being greater than one-half the length of the smallest radial sector of the track of the code disc confronting said slit, wherein the photocells are disposed on an axis and comprise an assembly having a base plate of electrically insulating material, a first and a second electrically conducting strip disposed on the base plate on opposite sides of the axis of the photocells, and spaced from each other, each pair of photocells confronting a track of the code disc, a first leg of electrically conducting material disposed on the base plate, extending from the first strip, and terminating adjacent to the axis of the photocells, a second leg of electrically conducting material disposed on the base plate, extending from the second strip, and terminating adjacent to the axis of the photocells, the second leg being spaced from the first leg along the axis by the distance between the pair of confronting tracks of the code disc, an electrically conducting terminal member disposed on the base plate having a first portion disposed on the side of the photocell axis opposite the first leg and confrontingly spaced therefrom, a second portion disposed on the side of the photocell axis opposite the second leg and confrontingly spaced therefrom, and an electrically conducting bar extending between the first and second portions and across the axis between the first and second legs, a mass of semi-conducting material disposed between the first leg and the first portion of the terminal member, a second mass of semiconducting material disposed between the second leg and the second portion of the terminal member, and means for sampling the position of the code disc during a time period short compared with the minimum time required for a sector of the code disc to rotate past the slit including an electrically responsive device having a triggering threshold and an input circuit coupled to each of the cells.

2. An optical encoder comprising a light source, a code disc rotatably mounted confronting the light source having a plurality of circular coaxial tracks with alternate opaque and transparent sectors, each track having two coaxial portions, one of said portions being a radially inward portion comprising a plurality of opaque and transparent sectors disposed between radii of the disc separated by equal angles and the other of said portions being a radially outward portion comprising a plurality of alternate transparent and opaque sectors disposed between the same radii of the disc, each transparent sector of each portion of track being disposed in the same radial sector of the code disc as an opaque sector of the other portion of the track, a pair of light responsive cells mounted on the side of the code disc opposite the source confronting each track of the code disc, each of said cells confronting the disc with one of the cells confronting a transparent sector and the other an opaque sector, an opaque member defining a transparent slit parallel to a radius of the code disc disposed between each of the cells and the code disc, the width of the slit being greater than one-half the length of the smallest radial sector of the track of the code disc confronting said slit, wherein the photocells are disposed on an axis and comprise an assembly having a base plate of electrically insulating material, a first and a second electrically conducting strip disposed on the base plate on the same side of the photocell axis and electrically insulated from each other, each pair of photocells comprisnig a first leg of electrically insulating material disposed on the base plate, extending from the first strip, and terminating adjacent to the axis of the photocells, a second leg of electrically conducting material disposed on the base plate, extending from the second strip, and terminating adjacent to the axis of the photocells, the second leg being electrically insulated from and spaced from the first leg along the axis by the distance between the pair of confronting tracks of the code disc, an electrically conducting terminal member disposed on the base plate on the opposite side of the photocell axis confronting the first and second legs, a mass of semiconducting material disposed between the first leg and the terminal member and between the second leg and the terminal member, and means for sampling the position of the code disc during a time period short compared with the minimum time required for a sector of the code disc to rotate past the slit including an electrically responsive device having a triggering threshold and an input circuit coupled to each of the cells.

3. An optical encoder comprising the element of claim 2 wherein a strip of electrically insulating material is disposed on the second strip of electrically conducting material and the second leg of each pair of photocells is disposed on the base plate and strip of insulating material.

4. An optical encoder comprising a light source, a code disc rotatably mounted confronting the light source having at least one circular track with alternate opaque and transparent sectors, a pair of light responsive cells mounted on the side of the code disc opposite the source, each of said cells confronting the disc with one of the cells confronting a transparent sector and the other an opaque sector, the opaque and transparent sectors being disposed between radii of the disc separated by equal angles, an opaque member defining a transparent slit parallel to a radius of the code disc disposed between each of the cells and the code disc, the width of the slit being no greater than one-half of the length of the smallest radial sector of the track of the code disc confronting said slit, and means for sampling the position of the code disc during a time period short compared with the minimum time required for a sector of the code disc to rotate past the slit including an electrically responsive device having a triggering threshold and an input circuit coupled to each of the cells and a pulse generator having two output terminals, the first of said output terminals periodically receiving a positive pulse and being electrically connected to one electrode of one photocell of each pair of photocells and the other output terminal receiving a negative pulse simultaneously with the pulse on the first output terminal and being electrically connected to one electrode of the other photocell of each pair, the input circuit of separate electrically responsive devices being electrically connected to the second electrode of both photocells of each pair.

5. An optical encoder comprising the elements of claim 4 wherein the periodic sampling means includes a sampling pulse generator having an output of the same polarity as the triggering threshold of the electrically responsive device electrically connected to the input of each electrically responsive device, the sum of the pulse output of the sampling pulse generator and only one of the responses of each pair of photocells exceeding the triggering threshold, said sampling pulse generator producing pulses of shorter duration than the pulse generator, and means synchronizing the output pulses of the sampling pulse generator to occur during the pulses of the pulse generator and after the pulses of the pulse generator complete their rise.

6. An optical encoder comprising the elements of claim 5 wherein the sampling pulse generator is provided with an input terminal and produces an output pulse responsive to a pulse on the input terminal thereof, and the synchronizing means comprises a delay line electrically connected between one of the output terminals of the pulse generator and the input terminal of the sampling pulse generator.

7. An optical encoder comprising a light source, a code disc rotatably mounted confronting the light source having at least one circular track with alternate opaque and transparent sectors, a pair of light responsive cells mounted on the side of the code disc opposite the source, each of said cells confronting the disc with one of the cells confronting a transparent sector and the other an opaque sector, the opaque and transparent sectors being disposed between radii of the disc separated by equal angles, an opaque member defining a transparent slit parallel to a radius of the code disc disposed between each of the cells and the code disc, the width of the slit being no greater than one-half of the length of the smallest radial sector of the track of the code disc confronting said slit, and means for sampling the position of the code disc during a time period short compared with the minimum time required for a sector of the code disc to rotate past the slit including an electrically responsive device having a triggering threshold and an input circuit coupled to each of the cells and a periodic pulse generator electrically coupled to the light source for producing periodic light flashes, a sampling pulse generator having an input terminal electrically coupled to the pulse generator and an output terminal electrically coupled to the input of each electrically responsive device, said sampling pulse generator producing pulses of shorter duration than the periodic pulse generator in response to each pulse of the pulse generator and of the same polarity as the triggering threshold of the electrically responsive device, the sum of the pulse output of the sampling pulse generator and only one of the responses of each pair of photocells exceeding the triggering threshold.

8. An optical encoder comprising a light source, a code disc rotatably mounted confronting the light source having at least one circular track with alternate opaque and transparent sectors, a pair of light responsive cells mounted on the side of the code disc opposite the source, each of said cells confronting the disc with one of the cells confronting a transparent sector and the other an opaque sector, the opaque and transparent sectors being disposed between radii of the disc separated by equal angles, an opaque member defining a transparent slit parallel to a radius of the code disc disposed between each of the cells and the code disc, the width of the slit being no greater than one-half of the length of the smallest radial sector of the track of the code disc confronting said slit, and means for periodically sampling the position of the code disc comprising a sequential pulse generator having an output terminal coupled to each pair of photocells, said sequential pulse generator producing periodic pulses on its output terminals each of output terminals receiving a pulse at a different time than the other terminals.

9. An optical encoder comprising the elements of claim 8 wherein each of the photocells comprises a pair of electrodes and a mass of semiconducting material disposed between the electrodes, and the sampling means includes a push-pull amplifier having a first input terminal connected to one electrode of one of the photocells of each pair and a second input terminal connected to one of the electrodes of the other photocell of each pair, the other electrodes of the photocells of each pair being electrically interconnected and connected to one of the output terminals of the sequential pulse generator.

10. An optical encoder comprising the elements of claim 9 wherein the sequential pulse generator is provided with an additional output terminal which receives a pulse simultaneously with a pulse on any other output terminal, said additional output terminal being electrically connected to the electrically responsive device, and said electrically responsive device triggering only during periods in which the sequential pulse generator receives a pulse on the additional output thereof.

References Cited by the Examiner

UNITED STATES PATENTS

| | | | |
|---|---|---|---|
| 2,966,671 | 12/60 | Abbott et al. | 340—347 |
| 3,020,534 | 2/62 | Jones | 340—347 |

MALCOLM A. MORRISON, *Primary Examiner.*